Jan. 30, 1945.      G. C. SZIKLAI      2,368,582
POWER, VOLTAGE, OR CURRENT REGULATOR
Filed Dec. 24, 1943      2 Sheets-Sheet 1
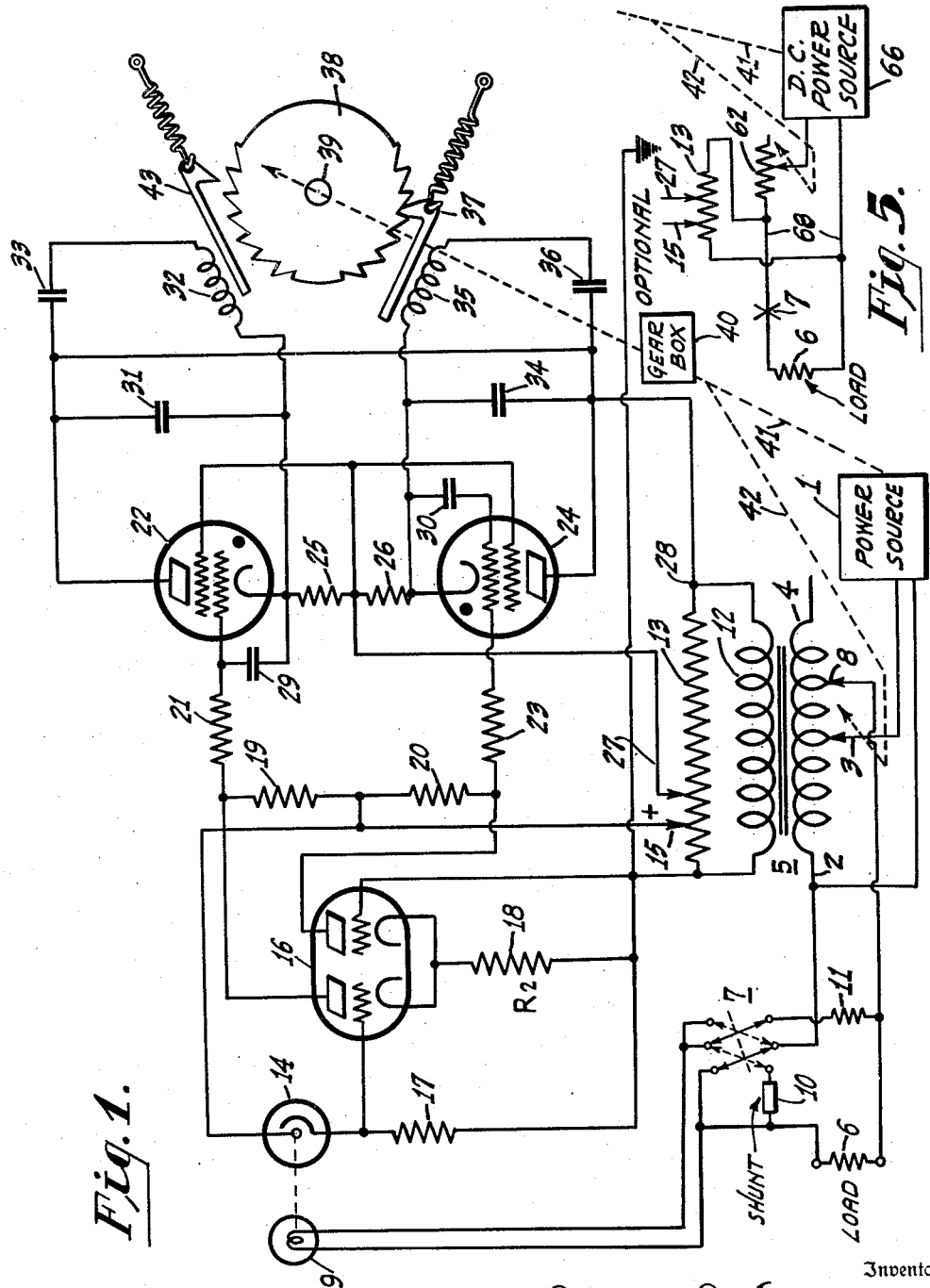
Inventor
GEORGE C. SZIKLAI
By
Attorney Jan. 30, 1945.   G. C. SZIKLAI   2,368,582
POWER, VOLTAGE, OR CURRENT REGULATOR
Filed Dec. 24, 1943   2 Sheets-Sheet 2
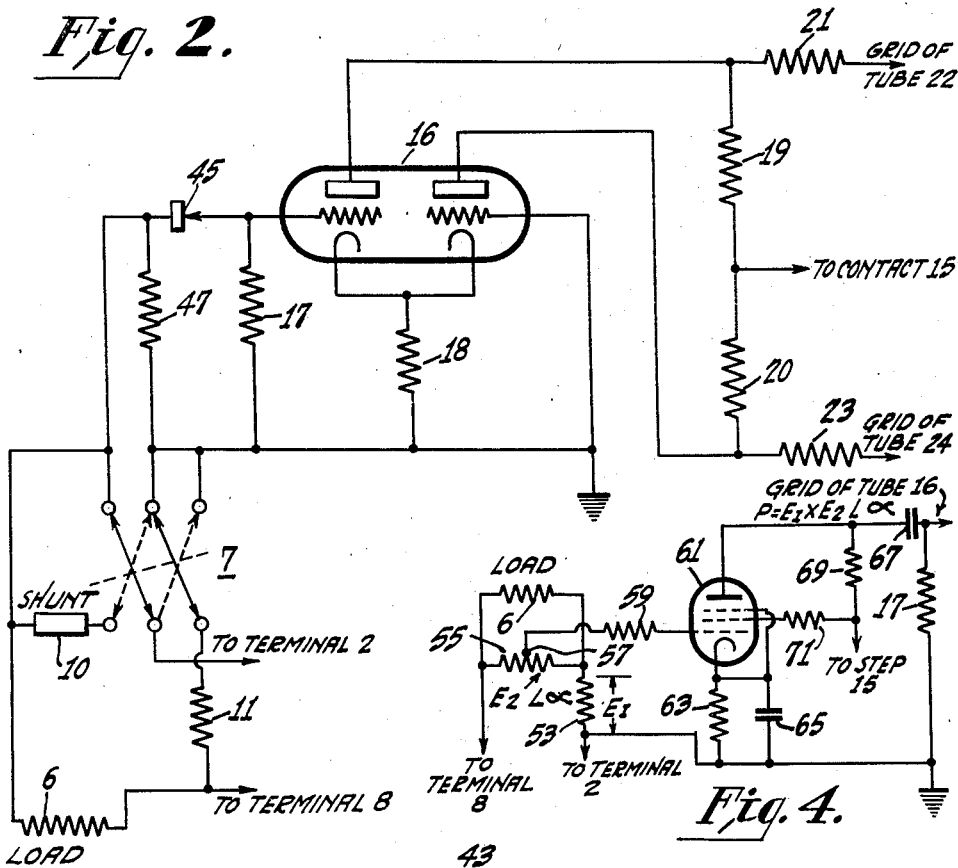
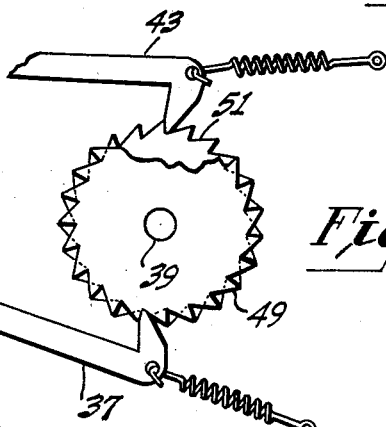
INVENTOR.
GEORGE C. SZIKLAI
By CD Cuska
ATTORNEY Patented Jan. 30, 1945

2,368,582

UNITED STATES PATENT OFFICE 2,368,582

POWER, VOLTAGE, OR CURRENT REGULATOR

George C. Sziklai, Princeton, N. J., assignor to Radio Corporation of America, a corporation of Delaware Application December 24, 1943, Serial No. 515,612

12 Claims. (Cl. 171—119)

This invention relates generally to electrical control apparatus and more particularly to an improved method of and means for regulating power, voltage, or current transmitted from a power source to a load.

Various types of electrical power, voltage and current regulators are known for controlling relatively low power networks such, for example, as radio circuits. Likewise, numerous semi-automatic or completely automatic electromechanical devices have been employed for controlling relatively high power networks. One of the principal disadvantages of many conventional high power control devices is lack of sensitivity to relatively small fluctuations in the power, voltage or current delivered to the load device. Another disadvantage of many known systems is the complex and expensive structure necessitated for obtaining relatively fine control for small fluctuations in the electrical energy delivered to the load.

The instant invention comprises several modifications of a relatively simple and inexpensive electrical circuit and electromechanical control device for regulating selectively the power, current, or voltage transmitted by any conventional alternating or direct voltage source to any type of electrical load device. The invention is readily adaptable to the direct control of the electrical energy derived from a power source, or, optionally, for the direct control of the prime mover which drives the power source providing the electrical energy. The desired degree of sensitivity of the control device to fluctuations in the electrical energy delivered to the load may be obtained readily by proper selection of the circuit constants.

Briefly, the invention comprises means for deriving a first voltage which is characteristic of the power, voltage, or current, as desired, of the electrical energy applied to a load device from either an alternating or uni-directional electrical power source. The derived voltage is applied to a conventional thermionic tube inverting network whereby a first control potential is derived for an increase in the first derived voltage and a second control potential is derived for a decrease in the first derived voltage. The control potentials are applied to separate thermionic tube pulse generators each of which provides a continuous series of current pulses as long as the corresponding control potential is applied to the particular pulse generator. The current pulses from each of the pulse generators are applied to separate electromagnetically actuated pawls which actuate a ratchet device secured to a control shaft. The control shaft may, if desired, be coupled through a conventional gear box, to an electrical or mechanical control device which is included in the power source. The pulses derived from the pulse generator will continue to actuate the pawl and ratchet combinations to step the control device in a sense to compensate for the increase or decrease in applied power, current or voltage applied to the load device. When the desired regulation has been obtained, the control potentials are eliminated, and no further stepping of the power adjusting mechanism is obtained. The desired operating power, voltage or current may be selected by simple adjustment of one or more of the circuit elements.

Among the objects of the invention are to provide an improved method of and means for regulating relatively large amounts of electrical energy transmitted by a power source to a load device. Another object of the invention is to provide an improved method of and means for regulating the voltage applied to a load device. A further object of the invention is to provide an improved method of and means for regulating the current applied to a load device.

An additional object of the invention is to provide an improved method of and means for selectively controlling the power, voltage, and current applied to a load device from a power source. Another object of the invention is to provide an improved method of and means for selectively regulating power, voltage, and current applied to a load device from either an alternating or uni-directional power source. A further object of the invention is to provide an improved voltage and current regulator wherein a lamp, illuminated in accordance with the electrical energy delivered to a load, actuates a photo-sensitive element to provide control potentials characteristic of an increase or decrease of said illumination, and wherein said control potentials actuate electromechanical stepping mechanisms which control the electrical power applied to the load.

The invention will be further described by reference to the accompanying drawings of which Figure 1 is a schematic circuit diagram of a photo-sensitive actuated voltage and current regulator in accordance with the invention; Figure 2 is a schematic circuit diagram of a modification of the input control circuits of said voltage and current regulator; Figure 3 is a fragmentary elevational view of a modification of the electromechanical ratchet shown in Figure 1, Figure 4 is a schematic circuit diagram of a modification of the input control circuits of the circuit of Figure 1 for the regulation of the power applied to a load device, and Figure 5 is a schematic circuit diagram of the power input portion of the circuit of Figure 1 for adapting said circuit to operation from a D.-C. power source. Similar reference characters are applied to similar elements throughout the drawings.

Referring to Figure 1, a power source 1 applies operating alternating potentials to a fixed terminal 2, and an adjustable terminal 3 of the primary winding 4 of a power transformer 5. A load 6 is connected through a switch 7 to the fixed transformer primary terminal 2 and to a second fixed primary transformer terminal 8. An incandescent lamp 9 connected to the switch 7 and operated in conjunction with a shunt 10 or a series resistor 11 is illuminated in accordance with the current or voltage, respectively, applied to the load 6 from the power source 1, depending upon the position of the double pole-two position switch 7. For the position of the switch contacts shown in heavy lines, the lamp illumination is a function of the voltage applied to the load 6. When the switch contacts are in the position shown by the dash lines, the illumination of the lamp 9 is in function of the current applied to the load 6. A secondary winding 12 of the transformer 5 is connected to the end terminals of a voltage divider 13 for providing operating voltages for the thermionic tube circuits to be described hereinafter.

Light from the lamp 9 impinges upon the photo-sensitive elements of a photo-electric cell 14. The anode of the photo-electric cell 14 is connected to a first adjustable contact 15 on the voltage divider 13. The cathode of the photo-electric cell 14 is connected to the control electrode of the first triode portion of a double triode thermionic tube 16. The control electrode of the first triode portion of the double triode tube 16 also is connected through a grid resistor 17 to the grounded terminal of the voltage divider 13. The cathodes of both triode portions of the double triode tube 16 are connected through a common cathode resistor 18 to the grounded terminal of the voltage divider 13. The control electrode of the second triode portion of the double triode tube 16 also is connected to the grounded terminal of the voltage divider 13. The anodes of the double triode tube 16 are connected to opposite ends of a pair of serially connected resistors 19, 20. The common terminal of the series resistors 19, 20 is connected to the first adjustable contact 15 on the voltage divider 13.

The anode of the first triode portion of the double triode tube 16 also is connected through a first coupling resistor 21 to the control electrode of a first pulse generator gas tube 22. The anode of the second triode portion of the double triode 16 is connected through a second coupling resistor 23 to the control electrode of a second pulse generator gas tube 24. The cathodes of the first and second pulse generator tubes 22, 24 are connected together through a pair of serially connected cathode resistors 25, 26. The common terminal of the serially connected cathode resistors 25, 26 is connected to a second adjustable contact 27 on the voltage divider 13, and to the screen electrodes of the pulse generator tubes 22, 24. Anode potential for the pulse generator gas tubes 22, 24 is obtained from the ungrounded end terminal 28 of the voltage divider 13. The control electrode-cathode circuits of the pulse generator tubes 22, 24 are bypassed by means of bypass capacitors 29, 30, respectively.

A first storage capacitor 31 is connected between the anode and cathode of the first pulse generator tube 22. The winding 32, of a first electromagnetic pawl device, serially connected through an output coupling capacitor 33, is connected across the first storage capacitor 31.

Similarly, a second storage capacitor 34 is connected between the anode and cathode of the second pulse generator tube 24, and the winding 35 of a second electromagnetic pawl device is serially connected, through a second output coupling capacitor 36, across the second storage capacitor 34.

*Operation*

In operation, an increase in the selected voltage or current applied to the load 6 provides an increase in the illumination of the lamp 9, and a corresponding decrease in resistance of the photo-electric cell 14. As the resistance of the photo-electric cell decreases, the control electrode of the first triode portion of the double triode tube 16 becomes more positive. The positive grid voltage on the first triode portion of the double triode tube 16 provides an increase in the anode current through the cathode resistor 18 and the anode resistor 19. Due to the current flowing in the common cathode resistor 18 for both triode portions of the double triode tube 16, the voltage of the control electrode of the second triode portion of the tube becomes more negative with respect to the cathode. Since the conductivity of the first triode portion of the tube is increased, the potential on the anode of that portion becomes more negative with respect to the cathode. Similarly, since the second triode portion of the double triode tube 16 becomes less conductive, the potential on the anode of the second triode portion becomes more positive with respect to the cathode.

As the anode of the second triode portion of the double triode tube 16 becomes more positive, it applies a positive potential to the control electrode of the second pulse generator tube 24, causing it to conduct and discharge the second storage capacitor 34 thereby providing a transient current pulse through the second electromagnetic pawl winding 35, which actuates the corresponding pawl 37, to turn the ratchet wheel 38 one step in a clockwise direction.

When the transient voltage across the storage capacitor 34 reaches a value lower than the voltage drop of the gas type pulse tube 24, the tube stops conducting until the storage capacitor 34 charges up to the firing potential, at which time a second discharge occurs through the tube 24 with a resultant second operation of the pawl 37, and further clockwise rotation ratchet wheel 38. The pulse generator 24 continues to actuate the pawl 37, and provide clockwise rotational stepping of the ratchet wheel 38, as long as the positive control potential is applied to its control electrode.

The ratchet wheel is secured to a control shaft 39 which, if desired, may be connected through a gear box 40 to control directly the power source 1 or the position of the adjustable contact 3 on the primary winding 4 of the transformer 5, as indicated by the dash lines 41, 42, respectively. Hence, rotation of the ratchet wheel 38 may provide compensating control of the power source or the auto transformer portion of the transformer 5 to regulate the voltage or current applied to the load. Such regulation of the voltage or current applied to the load 6 provides a corresponding variation in the illumination of the lamp 9, until the conductivity of the photo-electric cell 14 returns to its original value, at which time the positive control potential is removed from the control electrode of the second pulse generator 24 and the stepping action of the pawl 37 ceases.

Due to the symmetry of the circuit, a decrease in the illumination of the lamp 9, due to a decrease in the selected voltage or current applied to the load, provides an increase in the resistance of the photo-electric cell 14 which, through the double triode 16, applies a positive control potential to the control electrode of the first pulse generator 22, causing it to actuate the second pawl 43 to provide counter-clockwise rotational stepping of the ratchet wheel 38, and corresponding compensating adjustment of the power source 1 or the adjustable tap 3 of the transformer 5, in the same manner as described heretofore.

Figure 2 is a modification of the control tube circuit portion of the circuit of Figure 1, wherein the incandescent lamp 9 and photo-electric cell 14 are omitted, and a rectifier, connected between the switch 7 and the control electrode of the first triode of the double triode 16, is substituted therefor. A rectifier 45 which, for example, may be of the conventional copper-oxide, or diode thermionic tube types, is connected to the control electrode of the first triode portion of the double triode tube 16, to provide a control voltage thereon characteristic of the voltage drop across an input resistor 47 which is connected from the remaining terminal of the rectifier to the grounded terminal of the circuit. Since the input resistor 47 is connected to the load circuit through the switch 7 in the same manner that the filament of the incandescent lamp 9 is connected in the circuit of Figure 1, the voltage drop across the input resistor 47 is comparable to the voltage drop across the filament of the incandescent lamp 9.

The remainder of the control tube circuit is identical to that described heretofore in the circuit of Figure 1. It should be understood that the circuit described in Figure 1 and the modification thereof described in Figure 2 both provide for selective regulation of either the current or the voltage applied to the load 6, depending upon the setting of the switch 7 as described heretofore.

Figure 3 discloses a modification of the ratchet device which is disclosed in Figure 1 as a single ratchet wheel having oppositely facing ratchet teeth on each side thereof to permit rotation in either direction within limits of ±180°. In the instant modification of the device, two oppositely cut continuous ratchet wheels 49, 51 are mounted side by side on the control shaft 39. The first pawl 37 operates only upon the ratchet wheel 49, and the second pawl 43 operates only upon the ratchet wheel 51 whereby continuous rotation of the control shaft 39 in either clockwise and counter-clockwise directions may be obtained.

Figure 4 is a modification of the circuit of Figure 1 wherein a thermionic tube which, for example, may be of the conventional variable U type, is connected between the load circuit and the control electrode circuit of the first triode portion of the double diode tube 16, and the incandescent lamp 9 and photo-electric cell 14 are omitted. This modification of the circuit provides for regulation of the power delivered to the load. The load circuit includes a low resistance series resistor 53 connected between the transformer terminal 2 and one terminal of the load 6. A second resistor 55 having relatively high resistance, is connected in shunt with the load 6. The shunt resistor 55 includes a tap 57 which is connected, through a high resistance 59, to the control electrode of an amplifier tube 61. The cathode of the tube 61 is connected to ground through a parallel-connected cathode resistor 63 and cathode by-pass capacitor 65. The grounded end of the cathode resistor 63 is connected to the power source end of the load circuit series resistor 53.

The anode of the tube 61 is connected to the control electrode of the first triode portion of the double triode tube 16 through a coupling capacitor 65. Anode and screen potentials for the tube 61 are derived from the adjustable tap 15 on the voltage divider 13, and are applied to the corresponding electrodes through coupling resistors 69, 71, respectively.

The voltages across the load circuit series resistor 53 and the portion of the shunt resistor 55 intermediate the tap 57 and the resistor terminal which is connected to the series resistor 53, are added algebraically, and applied through the high resistor 59 to the control electrode of the tube 61. The voltage in the anode circuit of the tube therefore will be proportional to the product of the load current and load voltage, multiplied by the phase angle, and hence will be proportional to the actual power delivered to the load 6.

It should be understood that the use of intermediate gear boxes and particular mechanical actuating devices between the control shaft 39 and the power source 1, or between the control shaft and the adjustable tap 3 on the transformer primary winding 4, may be varied in any manner known in the art. It also should be understood that either the power generator or the prime mover, or the prime mover energy supply, may be controlled by the rotation of the control shaft 39.

Figure 5 indicates the modifications required in the circuit of Figure 1 for adapting the device to regulate the power, voltage or current delivered from a D.-C. source 66 to the load 6. The transformer 5 is eliminated, and a series power resistor 62 is substituted therefor. The switch 7, load 6 and voltage divider 13 are connected to the load line 68 on the load side of the series power resistor 62 which is serially-connected between one terminal of the power source 66 and one side of the load line. The control shaft 39 may actuate either the series power resistor, the D.-C. power source, or the prime mover therefor, as indicated by the dash lines 41, 42.

Thus the invention described comprises an improved method of and means for selectively regulating power, voltage, or current transmitted from a power source to a load device, wherein relatively simple thermionic tube circuits are employed to actuate a ratchet-operated mechanical control on the power source to compensate for variations in the electrical energy delivered to the load.

I claim as my invention:

1. A voltage regulator for a source of potential including an adjustable transformer connected to said potential source, means for deriving at least a predetermined portion of the output voltage of said transformer, means responsive to an increase in said derived voltage for deriving a first control potential, means responsive to a decrease in said derived voltage for deriving a second control potential, a pair of pulse generators, means responsive to said first control potential for deriving first pulses from one of said pulse generators, means responsive to said second control potential for deriving second pulses from the other of said pulse generators, voltage adjusting means for said transformer, and electromagnetic means operable upon said adjusting means and selectively responsive to said first and said second pulses for actuating said adjusting means in a sense to compensate for variations in said derived voltage.

2. A current regulator for a source of current including an adjustable transformer connected to said current source, means for deriving at least a predetermined portion of the output current of said transformer, means responsive to an increase in said derived current for deriving a first control potential, means responsive to a decrease in said derived current for deriving a second control potential, a pair of pulse generators, means responsive to said first control potential for deriving first pulses from one of said pulse generators, means responsive to said second control potential for deriving second pulses from the other of said pulse generators, voltage adjusting means for said transformer, and electromagnetic means operable upon said adjusting means and selectively responsive to said first and said second pulses for actuating said adjusting means in a sense to compensate for variations in said derived current.

3. A voltage regulator for a source of potential including an adjustable transformer connected to said potential source, means for deriving at least a predetermined portion of the output voltage of said transformer, light-sensitive means including a lamp responsive to an increase in said derived voltage for deriving a first control potential, means including said light-sensitive means responsive to a decrease in said derived voltage for deriving a second control potential, a pair of pulse generators, means responsive to said first control potential for deriving first pulses from one of said pulse generators, means responsive to said second control potential for deriving second pulses from the other of said pulse generators, voltage adjusting means for said transformer, and electromagnetic means operable upon said adjusting means and selectively responsive to said first and said second pulses for actuating said adjusting means in a sense to compensate for variations in said derived voltage.

4. A current regulator for a source of current including an adjustable transformer connected to said current source, means for deriving at least a predetermined portion of the output current of said transformer, light-sensitive means including a lamp responsive to an increase in said derived current for deriving a first control potential, means including said light-sensitive means responsive to a decrease in said derived current for deriving a second control potential, a pair of pulse generators, means responsive to said first control potential for deriving first pulses from one of said pulse generators, means responsive to said second control potential for deriving second pulses from the other of said pulse generators, voltage adjusting means for said transformer, and electromagnetic means operable upon said adjusting means and selectively responsive to said first and said second pulses for actuating said adjusting means in a sense to compensate for variations in said derived current.

5. A voltage regulator for a source of potential including an adjustable transformer connected to said potential source, means for deriving at least a predetermined portion of the output voltage of said transformer, light-sensitive means including a lamp responsive to an increase in said derived voltage for deriving a first control potential, means including said light-sensitive means responsive to a decrease in said derived voltage for deriving a second control potential, a pair of pulse generators, means responsive to said first control potential for deriving first pulses from one of said pulse generators, means responsive to said second control potential for deriving second pulses from the other of said pulse generators, voltage adjusting means for said transformer, and electromagnetic ratchet means operable upon said adjusting means and selectively responsive to said first and said second pulses for stepping said adjusting means in a sense to compensate for variations in said derived voltage.

6. A current regulator for a source of current including an adjustable transformer connected to said current source, means for deriving at least a predetermined portion of the output current of said transformer, light-sensitive means including a lamp responsive to an increase in said derived current for deriving a first control potential, means including said light-sensitive means responsive to a decrease in said derived current for deriving a second control potential, a pair of pulse generators, means responsive to said first control potential for deriving first pulses from one of said pulse generators, means responsive to said second control potential for deriving second pulses from the other of said pulse generators, voltage adjusting means for said transformer, and electromagnetic ratchet means operable upon said adjusting means and selectively responsive to said first and said second pulses for stepping said adjusting means in a sense to compensate for variations in said derived current.

7. A voltage regulator for a source of potential including an adjustable transformer connected to said potential source, means for deriving at least a predetermined portion of the output voltage of said transformer, an inverting circuit, light-sensitive means including a lamp responsive to an increase in said derived voltage for deriving a first control potential from said inverting circuit, means including light-sensitive means responsive to a decrease in said derived voltage for deriving a second control potential from said inverting circuit, a pair of pulse generators, means responsive to said first control potential for deriving first pulses from one of said pulse generators, means responsive to said second control potential for deriving second pulses from the other of said pulse generators, voltage adjusting means for said transformer, and electromagnetic means operable upon said adjusting means and selectively responsive to said first and said second pulses for actuating said adjusting means in a sense to compensate for variations in said derived voltage.

8. A power regulator for controlling the power transmitted from a source of electrical power to a load including means for deriving a first voltage proportional to the voltage across said load, means for deriving a second voltage proportional to the current in said load, means for combining said first and second voltages to derive a third voltage proportional to the power delivered to said load, means responsive to an increase in said third voltage for deriving a first control potential, means responsive to a decrease in said third voltage for deriving a second control potential, a pair of pulse generators, means responsive to said first control potential for deriving first pulses from one of said pulse generators, means responsive to said second control potential for deriving second pulses from the other of said pulse generators, power adjusting means for said power source, and electromagnetic means operable upon said adjusting means and selectively responsive to said first and said second pulses for actuating said adjusting means in a sense to compensate for variations in the power applied to said load.

9. A power regulator for controlling the power transmitted from a source of electrical power to a load including means for deriving a first voltage proportional to the voltage across said load, means for deriving a second voltage proportional to the current in said load, means for combining said first and second voltages to derive a third voltage proportional to the power delivered to said load, means responsive to an increase in said third voltage for deriving a first control potential, means responsive to a decrease in said third voltage for deriving a second control potential, a pair of pulse generators, means responsive to said first control potential for deriving first pulses from one of said pulse generators, means responsive to said second control potential for deriving second pulses from the other of said pulse generators, power adjusting means for said power source, and electromagnetic ratchet means operable upon said adjusting means and selectively responsive to said first and said second pulses for stepping said adjusting means in a sense to compensate for variations in the power applied to said load.

10. A power regulator for controlling the power transmitted from a source of electrical power to a load including means for deriving a first voltage proportional to the voltage across said load, means for deriving a second voltage proportional to the current in said load, means for combining said first and second voltages to derive a third voltage proportional to the power delivered to said load, an inverting circuit, light-sensitive means including a lamp responsive to an increase in said third voltage for deriving a first control potential from said inverting circuit, means including light-sensitive means responsive to a decrease in said third voltage for deriving a second control potential from said inverting circuit, a pair of pulse generators, means responsive to said first control potential for deriving first pulses from one of said pulse generators, means responsive to said second control potential for deriving second pulses from the other of said pulse generators, power adjusting means for said power source, and electromagnetic means operable upon said adjusting means and selectively responsive to said first and said second pulses for actuating said adjusting means in a sense to compensate for variations in the power applied to said load.

11. A voltage regulator for a source of potential including an adjustable voltage control device connected to said potential source, means for deriving at least a predetermined portion of the output voltage of said device, means responsive to an increase in said derived voltage for deriving a first control potential, means responsive to a decrease in said derived voltage for deriving a second control potential, a pair of pulse generators, means responsive to said first control potential for deriving first pulses from one of said pulse generators, means responsive to said second control potential for deriving second pulses from the other of said pulse generators, voltage adjusting means for said adjustable control device, and electromagnetic means operable upon said adjusting means and selectively responsive to said first and said second pulses for actuating said adjusting means in a sense to compensate for variations in said derived voltage.

12. A current regulator for a source of current including an adjustable current control device connected to said current source, means for deriving at least a predetermined portion of the output current of said device, means responsive to an increase in said derived current for deriving a first control potential, means responsive to a decrease in said derived current for deriving a second control potential, a pair of pulse generators, means responsive to said first control potential for deriving first pulses from one of said pulse generators, means responsive to said second control potential for deriving second pulses from the other of said pulse generators, voltage adjusting means for said adjustable control device, and electromagnetic means operable upon said adjusting means and selectively responsive to said first and said second pulses for actuating said adjusting means in a sense to compensate for variations in said derived current.

GEORGE C. SZIKLAI.